United States Patent

[11] 3,599,480

| [72] | Inventor | Walter F. Krieve |
| | | Palos Verdes Peninsula, Calif. |
| [21] | Appl. No. | 6,873 |
| [22] | Filed | Jan. 29, 1970 |
| [45] | Patented | Aug. 17, 1971 |
| [73] | Assignee | TRW Space Technology Laboratories |

[54] THRUST STAND
5 Claims, 2 Drawing Figs.

| [52] | U.S. Cl. | 73/117.4, 73/141 R |
| [51] | Int. Cl. | G01m.15/00 |
| [50] | Field of Search | 73/117.4, 141 |

[56] References Cited
UNITED STATES PATENTS

| 3,293,911 | 12/1966 | Ziegler | 73/141 |
| 3,495,454 | 2/1970 | Heimes | 73/133 (C) |

*Primary Examiner*—Jerry W. Myracle
*Attorneys*—Harry A. Herbert, Jr. and George Fine

ABSTRACT: The propulsion device or thruster is mounted on the balance beam so that the force it produces is normal to the plane of the beam and pivot line of the suspension system. The force will cause the beam to rotate about the pivot line of the crossed flexures, producing an electrical output which is proportional to the impulse produced during the thrust pulse. The time rate of change of the electrical output is proportional to the instantaneous thrust.

PATENTED AUG 17 1971 3,599,480

INVENTOR.
WALTER F. KRIEVE
BY Harry A. Herbert Jr.
George Fine
ATTORNEY

THRUST STAND

BACKGROUND OF THE INVENTION

Many space vehicles require propulsion devices which have thrust levels in the milli- and micro-pound range. These devices are required for space vehicle attitude control, station keeping, acquisition, and positioning. The propulsion devices must be capable of operating in both steady-state and pulsed modes. In order to select the proper quantity of propellant for a specific mission, the performance characteristics of the propulsion device must be known. A few of the required performance characteristics are the amount of thrust versus time, the total impulse per unit mass of propellant and the total thrust impulse per pulse. Therefore, when the performance characteristics are known, the propulsion device can be properly coupled with the space vehicle control logic to provide a particular mode of operation.

The prior art steady-state thrust measuring devices usually depend on the linear of angular displacement of a sensor for generating an output signal. The operation and calibration of these prior art devices are strongly influenced by the environment (vacuum, vibration, temperature, etc.) in which they operated and the weight of the propulsion system. There are prior art devices for measuring the instantaneous thrust level and the total impulse per pulse which require calibration inputs to duplicate the pulse bit to be measured. Since this is not possible to accurately achieve, many corrections are required to interpret the impulse data from such devices. The disclosed thrust stand apparatus eliminates the problems which are presented by these factors because it is a balanced beam, null-point device.

SUMMARY OF THE INVENTION

The present invention is a thrust stand which will measure either the steady-state thrust level of a low thrust rocket propulsion device or the instantaneous thrust and total impulse per pulse during pulsed operation of the device. The thrust stand is a null-point device which may be used for measuring either steady-state balance or pulse mode operation.

When used to monitor the pulse mode operation of a propulsion device, the present invention generates an electrical signal which is generated by the rotation of a coil within a magnetic field. The electrical output from the stand which is proportional to the impulse is produced during the thrust pulse. The instantaneous thrust is proportional to the time rate of change of the electrical output. The constants of proportionality for this thrust stand system are determined from the steady-state calibrations and are independent of the pulse shape.

It is one object of the invention, therefore, to provide an improved thrust stand apparatus having a balanced beam construction which makes it insensitive to vibration.

It is another object of the invention to provide an improved thrust stand apparatus having null-point operation to substantially reduce the effects of restraining forces from the propellant, and the power and instrumentation lines.

It is still another object of the invention to provide a thrust stand apparatus having position sensors, which are an integral part of the balance beam system, so that no mechanical adjusting is required for balancing electronic circuits.

It is still another object of the invention to provide a thrust stand apparatus having the capability of measuring total impulse as a function of time during a pulse transient.

It is a further object of the invention to provide a thrust stand apparatus having the capability of measuring total impulse as a function of time during a pulse transient.

It is a still further object of the invention to provide a thrust stand apparatus having a capability of measuring thrust level as a function of time during a pulse transient.

It is yet another object of the invention to provide a thrust stand apparatus having the capability of measuring thrust during both steady-state and pulsed operation.

These and other advantages, features and objects of the invention will become more apparent from the following description taken in connection with the illustrative embodiment in the accompanying drawings.

DESCRIPTION OF THE PREFERRED EMBODIMENT

Figure 1:
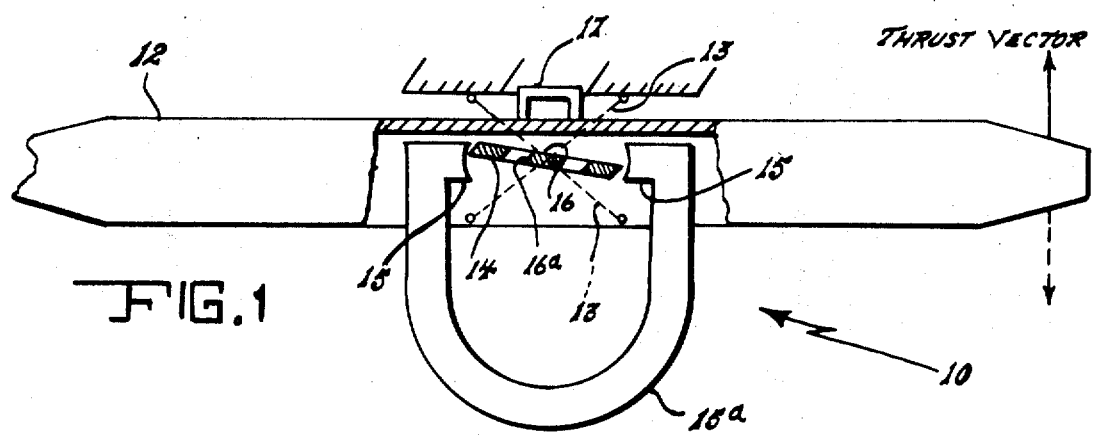
FIG. 1 is a side view, partially in section, of the thrust stand apparatus in accordance with this invention.

Referring now to FIG. 1, there is shown a thrust stand apparatus 10 for measuring either steady-state or transient thrust and the integrated impulse produced during a pulse by low thrust rocket engines. The thrust range over which the thrust stand apparatus 10 can operate is from several micro-pounds to several hundred milli-pounds. The thrust stand apparatus 10 is comprised of a balanced beam 12 which is suspended by two pairs of crossed flexural members 13. One pair of crossed flexural members 3 for each side of the balanced beam 12. The restoring spring constant of the suspension system may be adjusted by varying the position of the center of gravity of the suspended mass relative to that of the pivot line of the crossed flexures 13. A propellant plenum 17 is positioned atop balanced beam 12 in such a manner that the forces which are acting upon the balanced beam 12 prior to the firing of the propellant are substantially in equilibrium.

A flat, rectangular shaped wire coil 14 is rigidly attached to the balanced beam 12. The movement of the beam will cause this coil 14 to rotate about the pivot line of the crossed flexural members 13. The plane of the windings is inclined at a small angle with respect to the normal of the pole pieces 15 of a stationary permanent magnet 15a which makes it possible to exert a force in either direction of rotation.

A Hall-effect resistor 16 is mounted on the axis of the wire coil 14 with its sensing surface 16a normal to the coil plane. The sensing surface 16a of the Hall-effect resistor 16 is also inclined at the same angle as the coil 14 to the normal of the magnet pole pieces 15. This Hall-effect resistor 16 is the position sensor of the balanced beam 12. The Hall-effect resistor 16 is sensitive to the direction of rotation of the beam 12 due to its inclination to the permanent magnet pole piece 15. The Hall-effect resistor 16 is insensitive to the magnetic filed generated by the coil 14 because its sensing surface is normal to the coil plane.

Figure 2:
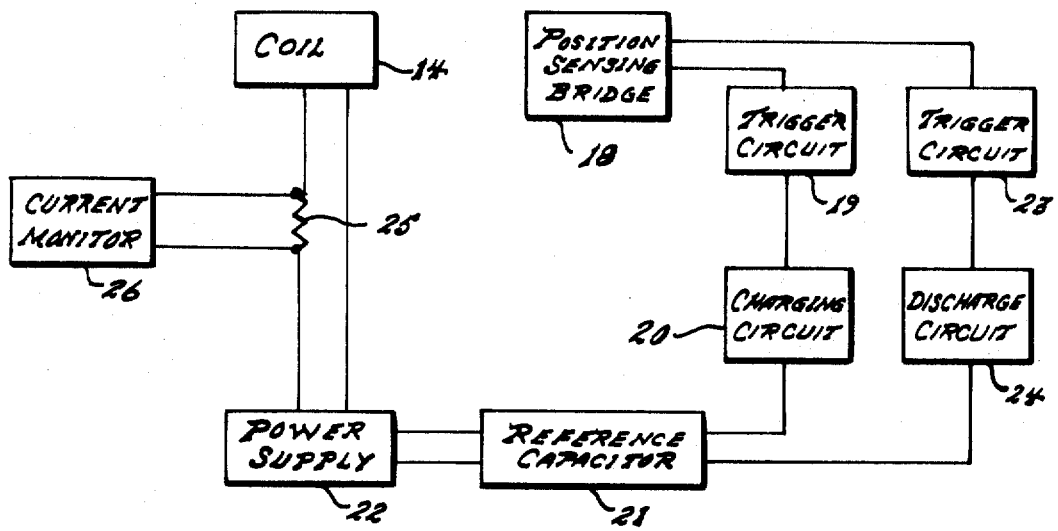
FIG. 2 is a block diagram of the thrust stand apparatus utilized to measure steady-state thrust.

During steady-state thrust measurements, the coil 14 is utilized to provide a restoring force to counteract the force which is produced by the thruster. Referring now to FIG. 2, the Hall-effect resistor 16 is connected as one leg of a resistance bridge circuit which is shown as the position sensing bridge 18. The movement of the balance arm will cause an unbalance in the position sensing bridge circuit 18. This unbalance condition produces a signal that activates a switch which is shown by trigger circuit 19. Trigger circuit 19 connects reference capacitor 21 to charging circuit 20 which charges reference capacitor 21 through a resistor and a voltage source (both not shown but included within the charging circuit 20) to predetermined voltage. The predetermined voltage is proportional to the value of the Hall-effect resistor 16. The voltage which is impressed upon reference capacitor 21 is utilized as a reference voltage to drive a power supply 22 which energizes the coil 14 of the thrust stand. If the restoring force produced by the coil 14 is too large, the beam will become unbalanced in the opposite direction. This in turn will cause the position sensing bridge 18 to become unbalanced in the opposite direction and will produce a signal that activates a switch, shown as trigger circuit 23, which connects discharge circuit 24 to the reference capacitor 21 and discharges it. During normal thruster operation, the balance beam 12 oscillates about the null-point. The amplitude and frequency of the oscillations may be adjusted by varying the charge and discharge time constants of the reference capacitor 21 circuit and the time constant of the balance beam 12. In the limit, the oscillations can be completely damped out. The magnitude of the current in the coil 14 at the null position is proportional to the thrust level and is measured by having current monitor 26 connected across resistor 25 which is in series with coil 14.

During pulsed thruster operation, the balance beam 12 is allowed to rotate freely with the spring constant of the suspension system as the only restraint. The monitored signal from the thrust stand is the voltage which is generated by the rotation of the coil 14 in the field of the permanent magnet 15a. The voltage which is generated during a thrust pulse is proportional to the total impulse of the pulse. The time rate of change of voltage during a thrust pulse is proportional to the instantaneous thrust level. A further understanding of operating principle may be achieved by referring to the following mathematical analysis of the present invention.

The equation which described the steady-state mode of operation is:

$$Fl = M_0 NI \qquad (1)$$

where:
$F$ = thrust level
$L$ = lever arm, perpendicular distance between thrust and pivot line
$M_o$ = number of lines of magnetic flux encircled by the coil at the null position
$N$ = number of turns in the coil
$I$ = current in the coil at the null position The thrust stand apparatus may be calibrated by placing known weight on the balance beam at a predetermined lever arm distance and measuring the current which is required to restore the arm to the null position. The calibration is linear; thus $$\left(\frac{Fl}{I}\right)_{ss} = \text{constant}$$

where ss = steady-state.

By making provisions to reverse the polarity of both the bridge and coil circuit, it is possible to measure thrust in both the up and down direction.

The equation which governs the motion of the balance arm during pulse mode is:

$$P\frac{d^2\theta}{dt^2} + A\frac{d\theta}{dt} + U\theta = F_1 \qquad (2)$$

where
$\theta$ = deflection angle of the beam
$P$ = angular movement of inertia of the system
$A$ = damping coefficient
$U$ = spring constant of the suspension system
$F$ = thrust level
$l$ = lever arm at which thrust is acting
$t$ = time The maximum deflection of the balance beam, $\theta_{max}$, when a thrust, $F$, is applied for a long period of time is:

$$\theta_{max} = \frac{Fl}{U} \qquad (3)$$

the spring constant of the suspension system, $U$, may be determined by placing a known weight on the balance beam at a known lever arm distance and measuring the amount of deflection of the beam. The natural frequency, $T_o$, of the system is $$T_0 = 2\pi \left(\frac{P}{U}\right)^{1/2}. \qquad (4)$$

This constant can be measured directly and the moment of inertia, $P$, of the system may be determined. The damping ratio, $\beta$, of the system can be expressed as:

$$\beta = \frac{A}{2(UP)^{1/2}}. \qquad (5)$$

The thrust stand is operated as an underdamped system; therefore, $\beta < 1$, and the solution to the equation of motion is:

$$\theta = \frac{(Fl)}{U}\left\{1 - \frac{1}{\sqrt{1-\beta^2}} \exp\frac{(-2\pi t\beta)}{T_0}\left[\sin\left(2\pi t\frac{\sqrt{1-\beta^2}}{T_0}\right.\right.\right.$$
$$\left.\left.\left. + \sin^{-1}\sqrt{1-\beta^2}\right)\right]\right\} \qquad (6)$$

Since there is no mechanical damping of the system and the monitoring circuit will have very high impedance, the actual damping ratio of the system is near zero $\beta << 1$. With this condition, the above equation reduces to:

$$\theta = \frac{Fl}{U}\left[1 - \cos\frac{2\pi t}{T_0}\right] \qquad (7)$$

The potential, E, generated by the coil rotating in the magnetic field is:

$$E = N\frac{dM}{dt} \qquad (8)$$

For the thrust stand in which this coil is displaced less than 10° from the normal of the pole pieces and the angular total motion is small, the time rate of change in the number of lines encircled by the coil, $dm/dt$, can be approximated by:

$$\frac{dM}{dt} = M_0 \frac{d\theta}{dt} \qquad (9)$$

The potential generated is, for equation (8) and (9), $$E = NM_0 \frac{d\theta}{dt} \qquad (10)$$

From equation (7), $$\frac{d\theta}{dt} = \left(\frac{Fl}{U}\right)\left(\frac{2\pi}{T_0}\right)\sin\frac{2\pi t}{T_0} \qquad (11)$$

By adjusting the moment of inertia and spring constant of the system, it is possible to have the condition of, $$\frac{2\pi t_0}{T_0} << 1$$

where $t_o$ is the duration of the thrust pulse. For this condition, $$\frac{d\theta}{dt} = \left(\frac{Fl}{U}\right)\left(\frac{2\pi}{T_0}\right)^2 t$$

and $$E = NM_0\left(\frac{Fl}{U}\right)\left(\frac{2\pi}{T_0}\right)^2 t \qquad (12)$$

By substituting equation (1) into equation (12) and rearranging terms, $$Ft = \left(\frac{I}{Fl}\right)ss\left(\frac{1}{U}\right)\left(\frac{T_0}{2\pi}\right)^2 E \qquad (13)$$

From this relationship, the integrated impulse from the thruster can be determined at any time $t_o$. The maximum potential generated during a pulse is proportional to the total impulse generated in the pulse.

The instantaneous thrust generated by the propulsion device is proportional to the time rate of change of voltage $$F = \left(\frac{I}{Fl}\right)ss\left(\frac{1}{U}\right)\left(\frac{T_0}{2\pi}\right)^2 \frac{dE}{dt} \qquad (14)$$

This may be measured directly by connecting the output from the coil across a capacitor of known values. The coil circuit can be described by $$\frac{dE}{dt} = \frac{i}{C} \qquad (15)$$

where C = capacitance
$i$ = charging current in the coil circuit

From equations (14) and (15), the instantaneous thrust is:

$$F = \left(\frac{I}{Fl}\right)ss\left(\frac{1}{U}\right)\left(\frac{T_0}{2\pi}\right)^2\left(\frac{i}{C}\right) \qquad (16)$$

Although the invention has been described with reference to a particular embodiment, it will be understood to those skilled in the art that the invention is capable of a variety of alternative embodiments within the spirit and scope of the appended claims.

I claim:

1. A thrust stand apparatus for measuring the amount of force created by a propulsion device comprising in combination:

a balanced beam having a null position, a position sensing means connected to said balanced beam for providing a position signal, said position signal representing the deviation of the balanced beam from said null position, and a position restoring means responsive to said position signal providing a restoring force, said position restoring means having a first member and a second member, said first member being stationary and said second member being moveable relative to said first member, said second member mounted on said balanced beam, said restoring force acting upon said second member to return said balanced beam to said null position, said position restoring means comprises a coil, a power supply, a reference capacitor and a switch means, said switch means being responsive to said position signal said switch means being connected to said reference capacitor, said switch means completing the charging path to charge said reference capacitor to a predetermined voltage when activated by said position signal, said reference capacitor being connected to said power supply and providing a reference voltage thereto, said power supply being connected to and driving said coil to provide said restoring force.

2. A thrust stand apparatus as described in claim 1 wherein said switch means comprises a trigger circuit connected to a charging circuit, said trigger circuit being responsive to said position signal, said trigger circuit completing said charging circuit when activated by said position signal, said charging circuit being a resistor connected to a voltage source 3. A thrust stand apparatus as described in claim 1 wherein said switch means comprises a trigger circuit connected to a discharge circuit, said trigger circuit being responsive to said position signal, said discharge circuit being connected to said reference capacitor, said trigger circuit completing the discharge path of said discharge circuit when activated by said position signal.

4. A thrust stand apparatus as described in claim 1 further including a current monitoring means connected in series with said coil and said power supply.

5. A thrust stand apparatus as described in claim 4 wherein said current monitoring means comprises a resistor connected in series with said coil and said power supply and a current monitor apparatus connected across said resistor.